United States Patent [19]

Cotsworth et al.

[11] 4,120,284
[45] Oct. 17, 1978

[54] CLIP FOR CLINCHING A HEAT EXCHANGE CONDUIT WITH A SOLAR HEAT ABSORBER

[76] Inventors: John L. Cotsworth, 11 Lake Rd., Short Hills, N.J. 07078; Daniel F. Ilich, 149-44 Cherry Ave., Flushing, N.Y. 11355

[21] Appl. No.: 787,386
[22] Filed: Apr. 14, 1977
[51] Int. Cl.² .............................................. F24J 3/02
[52] U.S. Cl. .................................. 126/270; 126/271; 165/49; 165/171; 24/257
[58] Field of Search ............... 165/49, 171; 126/270, 126/271; 60/641; 24/257; 403/188

[56] References Cited

U.S. PATENT DOCUMENTS

| 713,888 | 11/1902 | Kellner | 24/257 |
|---|---|---|---|
| 1,398,519 | 11/1921 | Hosch | 24/257 |
| 2,311,579 | 2/1943 | Scott | 126/271 |
| 2,687,626 | 8/1954 | Bartlowe | 165/171 X |
| 3,384,158 | 5/1968 | Rothenbach | 165/49 |

FOREIGN PATENT DOCUMENTS

| 194,295 | 10/1961 | Denmark | 165/171 |
|---|---|---|---|
| 340,675 | 10/1965 | Switzerland | 24/257 |

*Primary Examiner*—Allen M. Ostrager
*Attorney, Agent, or Firm*—Norman N. Popper; Daniel H. Bobis

[57] ABSTRACT

A clip for intimately engaging a solar-ray absorber in heat exchange relation with a conduit whereby a channelled absorber or fin receives the conduit in the channel; a generally C-shaped, resilient clip is applied to the back of the channel to embrace the absorber from behind and clinch it to wrap the channel closely around the conduit.

4 Claims, 7 Drawing Figures

CLIP FOR CLINCHING A HEAT EXCHANGE CONDUIT WITH A SOLAR HEAT ABSORBER

BACKGROUND OF INVENTION

1. Field of Invention

This invention relates generally to clips for holding components together, and specifically to a clip for rigidly securing a conduit to a fin or to a solar-ray absorber to provide for heat exchange.

2. Prior Art

Solar panels are devised for absorbing ultra-violet and infra-red rays from the sun. They usually provide a solar heat absorber arranged in intimate heat exchange relation with a conduit containing a heat exchange fluid. Instead of a large panel, the absorber may be a small element denominated as a fin. Merely to place the conduit upon the absorber will accomplish some heat exchange between a fluid in the conduit and the absorber, at the points of contact. It is recognized however that a large panel can absorb more heat that can be exchanged with a conduit by mere limited contact. The practice has grown to make a grid of conduits intercommunicating with each other and containing a fluid heat exchange medium. The grid of conduits mates with a corresponding series of channels in an absorber or fin. The grid is placed in the channels in the absorber so that heat exchange may take place between the elevated temperature achieved by the absorber and the grid of tubes, with the heat exchange fluid in the tubes.

In order to provide the most intimate and extensive interface contact between the conduit which is usually tubular and the absorber, solder is sometimes deposited in the channels to affix the conduits to the absorber. This procedure is not very satisfactory because even the lowest melting point solder alloys require considerable heat to melt them in order to attach the conduit to the absorber. The application of heat deforms the absorber and creates numerous ripples which reduces the satisfactory efficiency of the absorber in elevating the temperature of the fluid in the conduit. This happens because the absorber becomes rippled and the continuous intimate contact of the conduit with the channels in the absorber is reduced by reason of the rippling.

To avoid the problems arising from the use of heat to solder the tubes to the absorber, various kinds of adhesive or cements have been used to create an extensive interface between the absorber and the conduits. Unfortunately, most of the adhesives and cements have a low coefficient of thermal conduction so that they in effect, to a degree, insulate the absorber from the tubes and low efficiency heat exchange is the result. In an effort to overcome this problem, there have been adhesives to which a metal powder has been added and dispersed in order to achieve a higher coefficient of thermal conduction, but this does little to improve over all efficiency.

SUMMARY OF INVENTION

A way has been found to attain an improved interface between the absorber and the conduit, which interface is continuous and enveloping, and does not involve the use of solders or cements having low coefficients of thermal conduction, and which does not cause the rippling of the absorber so as to impair continuous intimate contact with the conduit. This is accomplished by a special C-shaped resilient clip made of metal. The clip may be rather narrow for application at intervals to the back of the channel in the absorber. Or on the other hand it may be an elongated member intended to be applied full length to the channel from one end to the other. The jaws of the clip are spaced apart a distance less than the width of the channel so that when it is applied to the back of the channel, it will resiliently engage the channel and cause the channel to intimately engage the conduit. In order to accomplish this, the jaws of the clip are spaced apart a distance less than the diameter of the conduit to be attached to an absorber. After a conduit is placed in a channel in an absorber, the jaws are forceably spread and applied to the back of the channel; they will spread and be deflected since the clip is made of resilient metal, and when they embrace the channel, they will close and clinch the absorber intimately to the conduit, thereby providing an intimate interface for effective heat exchange between the absorber and the conduit. A three point contact between the arms of the clip and the bottom of the clip insures intimate engagement of the absorber with the conduit.

THE DRAWINGS

These objects and advantages as well as other objects and advantages may be obtained by the device shown by way of illustration in the drawings in which.

PREFERRED EMBODIMENTS

Figure 2:
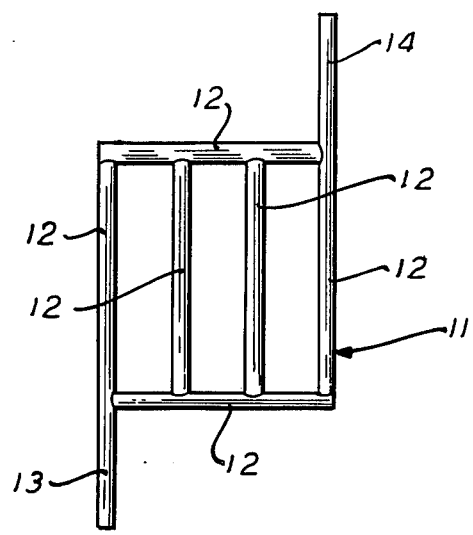
FIG. 2 is a plan view of a multi-path conduit for conducting heat exchange fluids in contact with an absorber.
Figure 3:
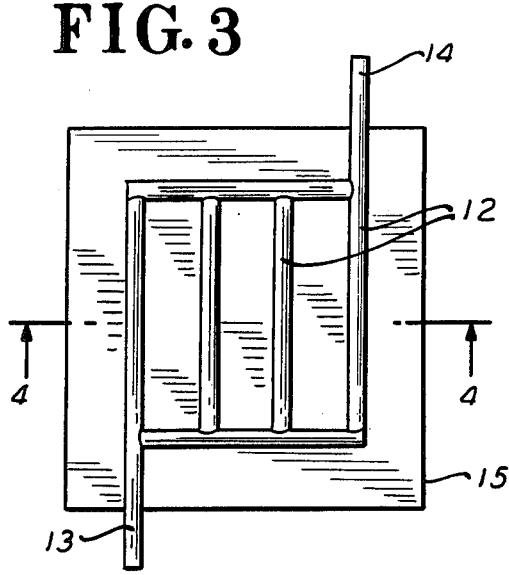
FIG. 3 is a top plan view of the multi-path conduit shown in FIG. 2 positioned in the channels in the absorber shown in FIG. 1.
Figure 4:
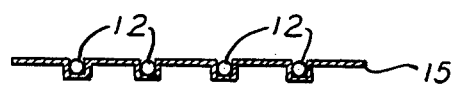
FIG. 4 is a vertical sectional view of the absorber and multi-path conduit taken on the line 4—4 in FIG. 3 looking in the direction of the arrows.

Referring now to the drawings in detail, FIG. 2 illustrates a grid 11 of individual intercommunicating conduits 12 whereby circulation of a fluid, heat exchange medium is provided for.

Many fluid heat exchange mediums are well known and readily available. The grid 11 has an intake 13 and an outlet 14.

Figure 1:
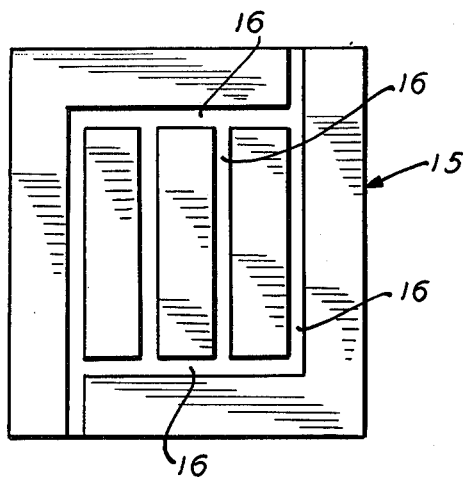
FIG. 1 is a top plan view of an absorber or fin having a plurality of channels therein to receive a multi-path conduit.

An absorber 15 is shown in FIG. 1. It has a plurality of channels 16 dimensioned to receive the grid 11. The absorber 15 (or fin as it may be called in certain embodiments) may be a sheet of metal such as copper or the like, having a high coefficient of thermal conductivity and absorption. A bright surface on the absorber 15 is known to reflect much of the solar rays in the ultra-violet or infra-red range and such bright surfaces are only used in solar devices where the reflected rays are to be concentrated on a particular focal point where temperature is to be raised. In the present device, dependence is on absorption of ultra-violet and infra-red rays, so the absorber 15 is provided with, alternatively a coat of dark paint such as it is available from the Aluminum Company of America as Alcoa number 655, or alternatively, the absorber 15 is provided with a dress of black nickel or black chromium; since solar absorbers may be exposed to the elements, although they may also be protected by glass covers, materials which are weather resistant or materials of choice, and black chromium and black nickel appear to have the best weather resistance combined with a very low coefficient of reflectivity and excellent thermal conduction, whereby the greatest amount of ulra-violet and infra-red rays are absorbed, with resultant high temperature of the absorber 15.

With the grid 11 of conduits 12 disposed in the channels 16, it is necessary to provide means to affirmatively position the grid in the channels 16 and to that end, the clip 17 is provided. The clip 17 is a member in the form of a strip of resilient metal having the normal shape generally like a C. Offset, integral, deflectable, arcuate arms 19 are formed on each longitudinal side of the clip 17. The arms are convex with respect to the central portion 18 of the clip 17. There are jaws 20 on the ends of the arms 19 which are spaced apart. The distance between the jaws is substantially less than the width of the control portion 18 and is calculated to be such that when the arms 19 are deflected, they may embrace a channel 16 and then resiliently return to their normal position to seize a conduit 12 and hold it in intimate engagement with the absorber 15 by deforming the channel 16 and wrapping it intimately around the conduit 12. The portion 18 of the clip 17 between the arms 19 may be generally externally concave, and the middle portion 21 generally convex with respect to the arms 19. This convex portion 21 in the generally concave area 18 defines a seat for the object which is clinched by the arms 19 within the clip 17.

Since the jaws 20 resiliently deform the channels 16 in the absorber 15, it is important that they do not have sharp ends which will break through the material of which the absorber 15 is made. In order to provide against such an event, the ends of the jaw 20 are folded over to provide a generally rounded smooth surface. The space between the jaws is also less than the width of the object to be clinched. Thus this space between the jaws 20 is smaller than the widths of an object to be clinched i.e. the space between the jaws 20 is less than the widths of the channels 16 and the diameter of the conduits 12. When the clip 17 is applied by spreading the jaws 20 and placed against the back of a channel 16, the arms 19 will resiliently clinch the channel 16 and the tube 12 within it.

Figure 7:
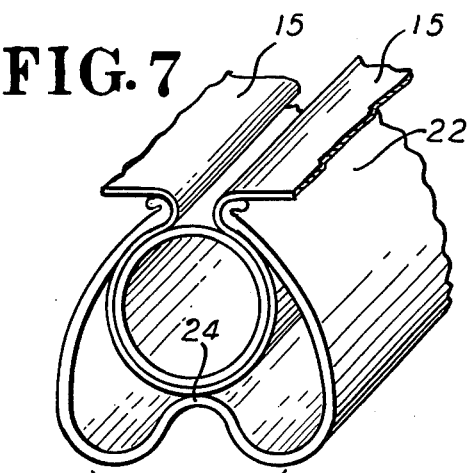
FIG. 7 is a perspective view showing another form of the clip securing a conduit in a channel in an absorber.
Figure 6:
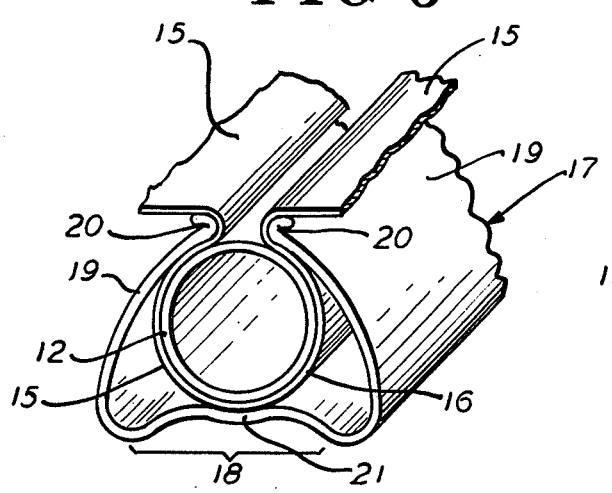
FIG. 6 is a perspective view showing the one form of the clip applied to an absorber and securing a conduit in a channel in the absorber.
Figure 5:
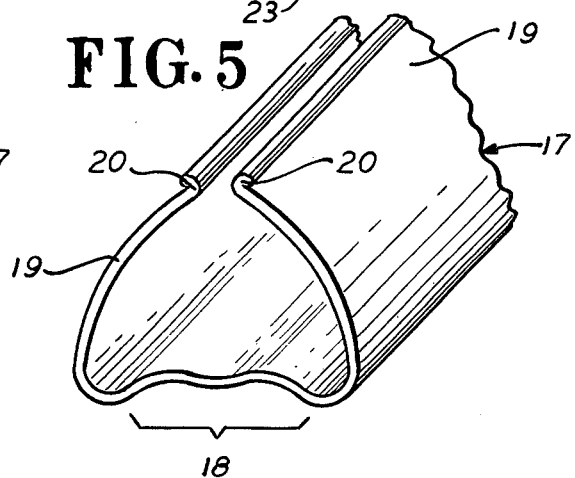
FIG. 5 is a perspective view of one form of clip for securing conduits in channels in absorbers.

Another more simple form of the clip 17 is shown in FIG. 7. This clip 22 has a portion 23 which does not have a concavity 21 to receive and seat an absorber 15 with a tube 12 in the channel 16. Instead of such a concave member, a longitudinal rib 24 is provided to define a seat for the absorber 15 and the tube 12 contained in the channel 16 of the absorber 15 so that the arms 19 will hold the absorber 15 in close heat exchange relationship with the conduits 12.

What is claimed is:

1. A clip for clinching a heat exchange conduit with a solar heat absorber comprising:
   (a) a generally C-shaped, resilient member having a central portion and outer portions,
   (b) the outer portions being externally convex, and deflectable, and defining arms for clinching an object therebetween,
   (c) an arch on the central portion on the member, between the arms, for supporting the object clinched between the arms,
   (d) a solar heat absorber,
   (e) a conduit in contact with a portion of the solar heat absorber,
   (f) the C-shaped member embracing the solar heat absorber and deforming it to embrace the conduit.

2. A clip for clinching a heat exchange conduit with a solar heat absorber comprising:
   (a) a generally C-shaped, resilient member having a central portion and outer portions,
   (b) the outer portions being externally convex, and deflectable, and defining arms for clinching an object therebetween,
   (c) an arch on the central portion on the member, between the arms, for supporting the object clinched between the arms,
   (d) a solar heat absorber,
   (e) a channel in the solar heat absorber,
   (f) a conduit in contact with the channel,
   (g) the C-shaped member embracing the channel in the solar heat absorber and deforming it to embrace the conduit.

3. A clip for clinching a heat exchange conduit with a solar heat absorber comprising:
   (a) a generally C-shaped, resilient member having a central portion and outer portions,
   (b) the outer portions being externally convex, and deflectable, and defining arms for clinching an object therebetween,
   (c) an arch on the central portion on the member, between the arms, for supporting the object clinched between the arms,
   (d) the ends of the arms folded over to present a smooth rounded surface to an object to which the member is applied,
   (e) the distance between the ends of the arms being less than the central portion of the member,
   (f) the distance between the ends of the arms being less than the width of an object to be clinched therebetween,
   (g) a solar heat absorber,
   (h) a conduit in contact with a portion of the solar heat absorber,
   (i) a channel in the solar heat absorber,
   (j) a conduit in contact with the channel,
   (k) the C-shaped member embracing the channel in the solar heat absorber and deforming it to embrace the conduit.

4. A method of intimately engaging a conduit to a solar heat absorber in intimate heat exchange relation comprising:
   (a) providing a solar heat absorber,
   (b) impressing a channel for a conduit on the surface of the solar heat absorber,
   (c) positioning a conduit in the channel,
   (d) providing a resilient C-shaped clip,
   (e) spreading the resilient C-shaped clip sufficiently to embrace the back of the channel,
   (f) applying the clip to the back of the channel,
   (g) allowing the clip to constrict around the channel with the conduit in it, to clinch the conduit in the channel in intimate heat exchange relation to the solar heat absorber.

* * * * *